No. 669,675. Patented Mar. 12, 1901.
T. A. BEEM.
FENCE POST MAKING MACHINE.
(Application filed Aug. 2, 1900.)

(No Model.) 3 Sheets—Sheet 1.

WITNESSES:
R. G. Hessong.
A. L. Phelps.

INVENTOR
Thomas A. Beem
BY
C. C. Shepherd
ATTORNEY

No. 669,675. Patented Mar. 12, 1901.
T. A. BEEM.
FENCE POST MAKING MACHINE.
(Application filed Aug. 2, 1900.)
(No Model.) 3 Sheets—Sheet 2.
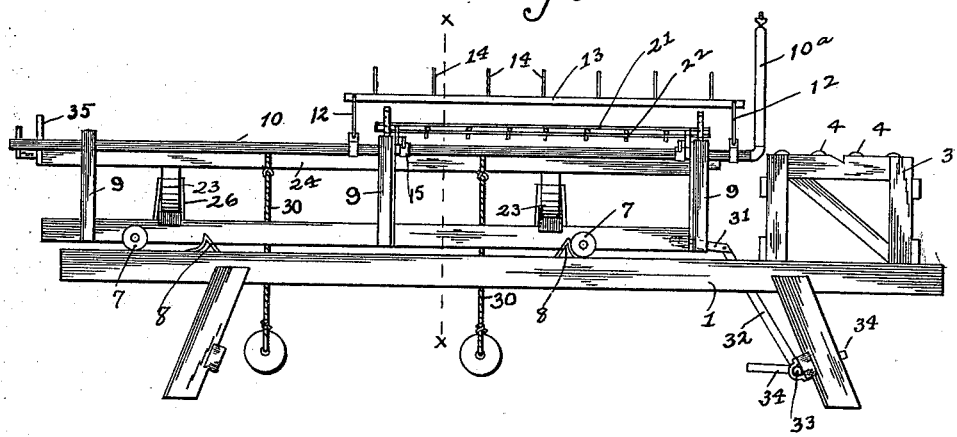
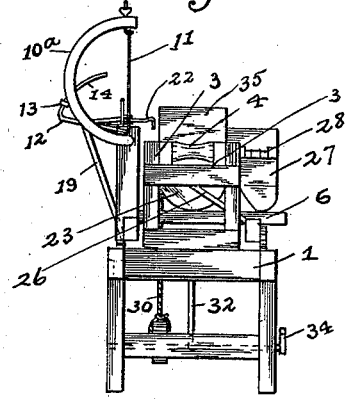
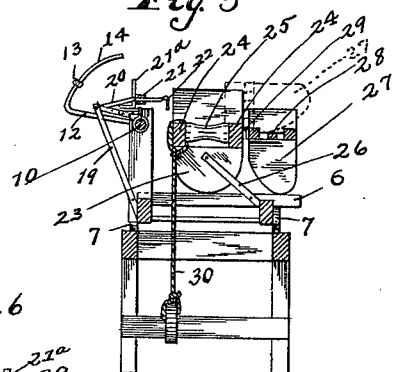
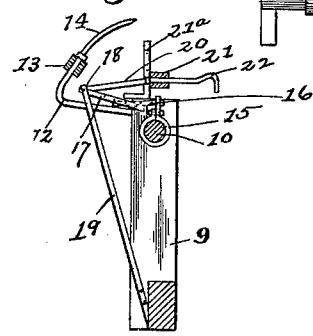
WITNESSES:
R. G. Hessong
A. L. Phelps
INVENTOR
Thomas A. Beem
BY
C. C. Shepherd,
ATTORNEY No. 669,675. Patented Mar. 12, 1901.
T. A. BEEM.
FENCE POST MAKING MACHINE.
(Application filed Aug. 2, 1900.
(No Model.) 3 Sheets—Sheet 3.

WITNESSES:
R. H. Hessing.
A. L. Phelps.

INVENTOR
Thomas A. Beem
BY
C. Shepherd
ATTORNEY

1
UNITED STATES PATENT OFFICE.

THOMAS A. BEEM, OF SUMMIT, OHIO.

FENCE-POST-MAKING MACHINE.

SPECIFICATION forming part of Letters Patent No. 669,675, dated March 12, 1901.

Application filed August 2, 1900. Serial No. 25,626. (No model.)

*To all whom it may concern:*

Be it known that I, THOMAS A. BEEM, a citizen of the United States, residing at Summit, in the county of Licking and State of Ohio, have invented a certain new and useful Improvement in Fence-Post-Making Machines, of which the following is a specification.

My invention relates to tile-fence-post-making machines; and the objects of my invention are to provide an improved mechanism for producing tile or clay fence-posts, to provide improved means for handling and cutting the clay cylinders or tubes which are employed as posts, to provide in conjunction with said machine means for perforating the tubular clay bodies and for indenting the peripheries of the same, and to produce other improvements which will be more fully pointed out hereinafter. These objects I accomplish in the manner illustrated in the accompanying drawings, in which—

Figure 1:
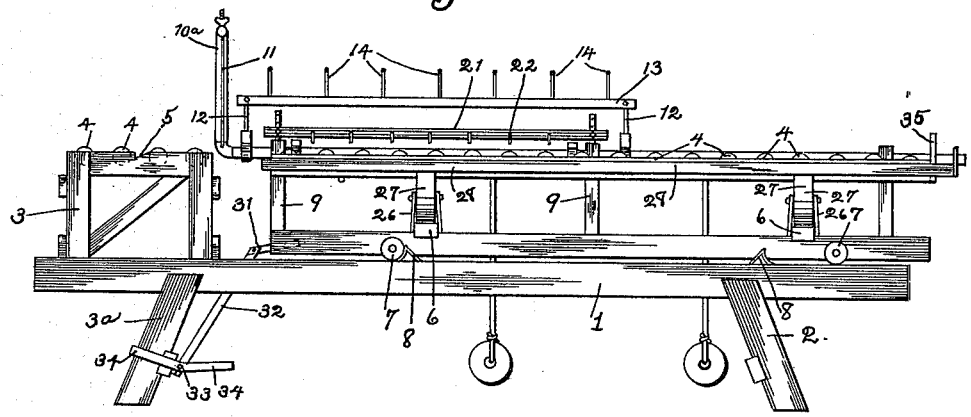
Figure 2:
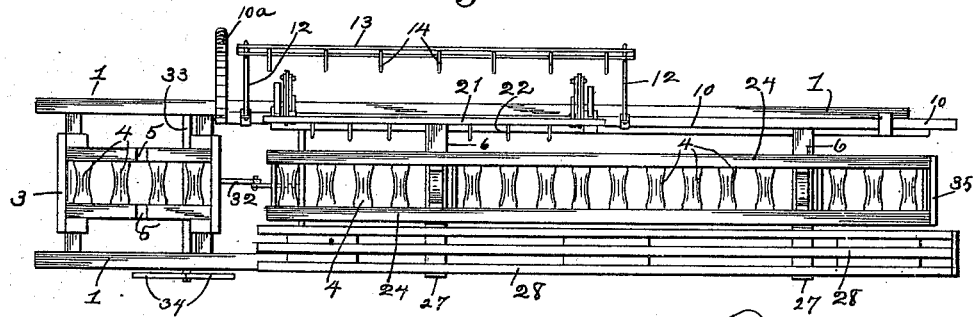
Figure 2A:
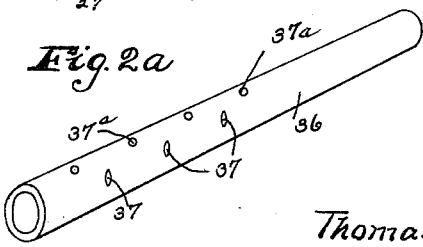
Figure 7:
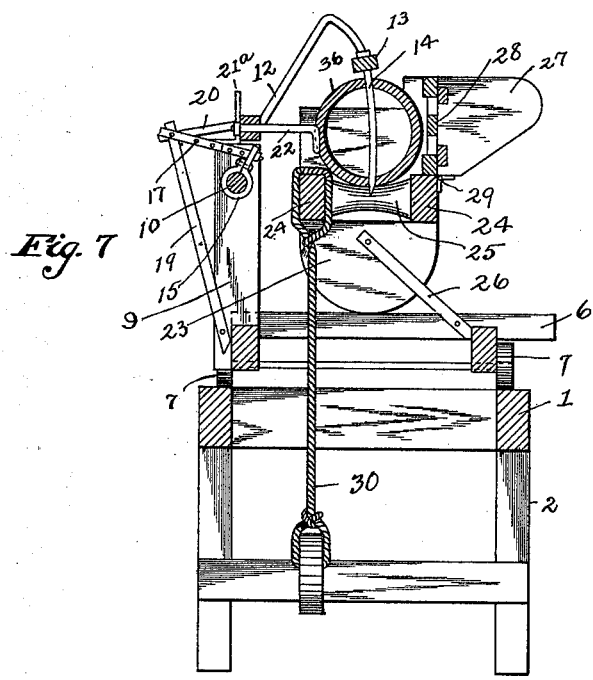

Figure 1 is a side elevation of my improved machine. Fig. 2 is a plan view. Fig. 2$^A$ is a view in perspective of one of the tubular bodies or posts produced by the machine. Fig. 3 is a side elevation showing the opposite side of the machine from that illustrated in Fig. 1. Fig. 4 is a front end view. Fig. 5 is a sectional view on line $xx$ of Fig. 3. Fig. 6 is an enlarged transverse section through one side of the machine, showing a perforating and indenting mechanism; and Fig. 7 is an enlarged sectional view on line $xx$ of Fig. 3, showing the parts in operating positions.

Similar numerals refer to similar parts throughout the several views.

In carrying out my invention I employ an oblong base-frame consisting of connected parallel side bars 1, from which suspend suitable supporting-legs 2. Upon the forward end portion of the base-frame I support an upright receiving-table frame 3, the parallel sides of the upper portion of which have journaled therein transverse rollers 4. The top side bars of the frame 3 are notched centrally on their upper sides, as indicated at 5.

6 represents an oblong carriage, the sides of which are provided with journaled wheels 7, which are adapted to bear and run upon the base-frame side bars 1. The carriage thus formed is limited in its extent of outward and inward movement upon the base-frame by stop projections 8, which rise at suitable intervals from the upper sides of the frame side bars 1, the rear and front wheels 7 being adapted when said carriage is moved a predetermined distance in either direction to come into contact with said projections. Rising from one side of the carriage 6 at suitable intervals are vertical standards 9, these standards having journaled in their upper portions a longitudinally-arranged shaft 10. As indicated more clearly in Fig. 4 of the drawings, the inner end, or that end of the shaft 10 which is nearest to the receiving-table 3, is provided with an upwardly-extending C-shaped arm 10$^a$. This C-shaped arm or head 10$^a$ is crossed by a cutting-wire or suitable blade 11. Carried on the shaft 10 are outwardly and thence upwardly extending arms 12, the outer end portions of which support the ends of a horizontal bar 13, this bar being provided at intervals with upwardly and inwardly extending punching-fingers 14. With shaft-brackets 15, which are mounted on the shaft 10 at points adjacent to two of the standards 9, are connected laterally-extending arms 16, with each of which is pivotally connected an outwardly-extending bar 17, this bar having its outer end pivotally connected at 18 with the upper end of a bar 19, which inclines from the adjoining post 9.

20 represents short bars, the outer ends of which are pivotally connected, respectively, with the outer ends of the bars 17, and the inner ends of said bars 20 are connected with a horizontal indenting-finger-holding bar 21, the latter being united with angular slide-brackets 21$^a$, movably supported on the upper sides of the standards 9. As shown more clearly in Fig. 3 of the drawings, this bar 21 preferably consists of two parallel sections suitably united, and between said sections are adjustably supported the inner ends of outwardly-projecting indenting-fingers 22, the latter having downturned ends, as shown. Mounted upon the central portion of the carriage-platform 6 are the rounded surfaces of half-round rocking blocks 23, on which are mounted longitudinally parallel bars 24, these bars being connected at intervals by transverse concaved rollers 25, which are journaled therein. The rocking blocks or bodies 23 have pivotally connected with their opposite sides the inner ends of inclined bars 26, the outer ends of which are secured to the carriage 6.

27 represents the depending foot blocks or supports of a longitudinally-arranged pallet 28, which consists of united parallel bars, as shown. The pallet-body thus formed is hinged, as indicated at 29, to the outer side of one of the bars 24. The lower or supporting end of each of the blocks 27 is rounded, as indicated in Figs. 4 and 5 of the drawings, this end normally bearing upon the outer portion of the carriage 6, while the upper portions of said foot-blocks extend above the pallet-body, as shown. Depending from that frame-bar 24 which is on the opposite side of the machine from the pallet are weight or counterbalance supporting ribs 30. Pivotally connected with an extension-bar 31 on the forward end of the carriage is the upper end of a downwardly and forwardly extending bar 32, the latter being rigidly connected with a transverse shaft 33, which is journaled in bearings on the legs 3ª of the receiving-table 3. On one of the outer ends of the shaft I provide a foot piece or tread, which is in the form of an obtuse-angled plate 34, the central portion of which is fixed on said shaft. To the outer end of the parallel bars 24 I secure the lower portion of an upwardly-projecting stop-plate 35.

In utilizing my invention the tubular clay body from which the cylindrical posts are to be formed is fed from a suitable molding-machine horizontally onto the rollers 4 of the receiving-table 3. This tubular body travels over said rollers 4 and onto the rollers 25, over which said body moves rearwardly until its end is in contact with the stop projection 35. During this operation the carriage 6 has its forward end supported in close proximity to the receiving-table, so that the cutting wire or blade 11 is opposite said receiving-table. When the tubular clay body comes into contact with the projection 35, the knife-supporting arm of the shaft 10 is forced downward by hand to a horizontal position, resulting in the blade or arm 11 severing said tubular body and entering the notches 5 of the receiving-table frame. In the partial rotation thus imparted to the shaft 10 it will be seen that the fingers 14 will be forced through the tile body, which is shown in Fig. 2ᴬ at 36, forming the perforations 37. It will also be observed that in this partial rotation of the shaft the indenting-fingers 22 will through their jointed connection with said shaft move inward sufficiently to scratch or indent the periphery of the tubular body in the manner indicated at 37ª in Fig. 2ᴬ. The operator now placing his foot upon the rearwardly-extending wing of the tread 34 forces the carriage outward and away from the receiving-table to the positions indicated in the drawings. During the operation above described the pallet-frame and its supporting-body 27 28 are turned upward to the position indicated in dotted lines in Fig. 5 and in Fig. 7 of the drawings, said slotted pallet-frame thus standing at right angles with the direction of the length of the frame-bars 24. The tubular post, formed as above described and severed from the tubular clay body, is now moved onto the pallet-frame by rolling or swinging the frame-supporting blocks 23 outward until the post is in contact with the pallet and the latter is lowered to the position shown in full lines in the drawings. The pallet being thus lowered until in the horizontal position indicated in full lines in Figs. 4 and 5, it will be seen that the support of the tubular post will have been transferred from the frame 23 to the pallet. The weights 30 now serve to return the frame 23 24 to its normal position. The carriage 6 is now moved back until its forward end is in close proximity to the receiving-table, this being accomplished by the operator pressing his foot upon the forward wing of the tread-plate 34. The rollers 25 of the frame-bars 24 are now again in position to receive the moving tubular body from the receiving-table, and the shaft 10 having been so rotated as to return the cutting, perforating, and indenting devices to their normal positions said parts are again ready for operation when the tubular body comes into contact with the stop projection 35. The tubular posts as they are delivered onto the pallet, as above described, are moved from the machine without being detached from the pallet-frame by lifting the latter and depositing it at a suitable point for drying the post before the latter is burned. As one pallet is thus removed from the machine another is substituted therefor.

Although not forming a part of my invention, it will be understood that the tubular posts herein produced are designed particularly as fence-posts, although the same may be applied to other uses, and that the perforations 37 are designed to have passed therethrough fence-wires, while the indentations or recesses 37ª may be engaged by the fence-wires to insure the latter in their proper engagement with the post and in proper relative positions in case the engagement of the fence-wires and post is intended to be effected by winding the wire about the post instead of running the same through the perforations.

From the construction shown and described it will be seen that a simple, reliable, and effective machine is produced, whereby the tubular clay posts may be properly formed in a rapid and convenient manner.

Having now fully described my invention, what I claim, and desire to secure by Letters Patent, is—

1. In a fence-post-making machine, the combination with a receiving-table 3 and journaled rollers therein, of a frame 24 and rollers journaled therein, a journaled shaft 10 having a projecting knife-carrying arm and perforating-fingers connected with said shaft, substantially as specified.

2. In a fence-post-making machine, the combination with a base-frame, a receiving-table supported thereon and a carriage-frame movably supported on said base-frame, of a post-supporting framework having a rocking support on said carriage-frame, a journaled shaft, a post-cutting device carried on said shaft and inwardly-turned perforating-fingers also connected with said shaft, substantially as specified.

3. In a fence-post-making machine, the combination with a receiving-table having transverse rollers journaled therein, a movable carriage and a frame provided with transverse rollers and having a rocking support on said carriage, of a journaled shaft 10, a cutting device carried on an arm thereof, perforating-fingers connected with said shaft and indenting-fingers also connected with said shaft, substantially as specified.

4. In a fence-post-making machine, the combination with a receiving-table, a movable carriage and a frame provided with transverse rollers and having a rocking support on said carriage, of a detachable pallet having its supports hinged in connection with the supports of said roller-frame, substantially as specified.

THOMAS A. BEEM.

In presence of—
BURT McINTOSH,
REX McINTOSH.